United States Patent
Vollmer

[11] Patent Number: 5,340,185
[45] Date of Patent: Aug. 23, 1994

[54] VEHICLE SAFETY SEAT HAVING A RAISABLE FRONT EDGE

[75] Inventor: Elmar Vollmer, Wettstetten, Fed. Rep. of Germany

[73] Assignee: Audi Ag, Ingolstodt, Fed. Rep. of Germany

[21] Appl. No.: 983,529

[22] PCT Filed: Jul. 26, 1991

[86] PCT No.: PCT/EP91/01401
  § 371 Date: Mar. 1, 1993
  § 102(e) Date: Mar. 1, 1993

[87] PCT Pub. No.: WO92/06861
  PCT Pub. Date: Apr. 30, 1992

[30] Foreign Application Priority Data
  Oct. 12, 1990 [DE] Fed. Rep. of Germany ....... 4032385

[51] Int. Cl.$^5$ .............................................. B60N 2/42
[52] U.S. Cl. ................... 296/68.1; 297/216.18; 297/284.11
[58] Field of Search ............... 296/68.1; 297/216.18, 297/216.16, 216.1, 284.11

[56] References Cited

U.S. PATENT DOCUMENTS

| | | | |
|---|---|---|---|
| 2,970,862 | 2/1961 | Racine | 296/68.1 |
| 3,556,584 | 1/1971 | Simon | 296/68.1 |
| 3,578,376 | 5/1971 | Hasegawa et al. | 296/68.1 |
| 3,858,930 | 1/1975 | Calandra et al. | 296/68.1 |
| 3,998,291 | 12/1976 | Davis | 296/68.1 X |
| 4,154,472 | 5/1979 | Bryll | 244/68.1 |
| 4,623,192 | 11/1986 | Koide et al. | 27/216 |

FOREIGN PATENT DOCUMENTS

| | | | |
|---|---|---|---|
| 2913474 | 10/1980 | Fed. Rep. of Germany | 297/216.1 |
| 3337232 | 6/1983 | Fed. Rep. of Germany | B60R 21/02 |
| 3631881 | 9/1986 | Fed. Rep. of Germany | B60R 21/02 |
| 1012718 | 4/1952 | France | B60N 1/00 |
| 1604358 | 11/1971 | France | |
| 2237452 | 1/1975 | France | B60R 21/08 |
| 2261158 | 9/1975 | France | B60R 21/10 |
| 2572034 | 4/1986 | France | 296/68.1 |
| 5853525 | 3/1983 | Japan | 297/216.1 |
| 1275230 | 11/1989 | Japan | 297/216.1 |

Primary Examiner—David M. Mitchell
Assistant Examiner—Gary C. Hoge
Attorney, Agent, or Firm—Jacques M. Dulin

[57] ABSTRACT

A safety device in a motor vehicle including a lifting mechanism for raising a front or leading edge section of a seat cushion of a motor vehicle seat assembly. The vehicle seat assembly is supported on a set of longitudinally disposed seat rails attached to the interior floorboard of the vehicle. The seat assembly is adjustable forwardly or rearwardly in a lengthwise direction along the seat rails. The seat assembly is locked at selected positions along the seat rails by a catch mechanism. A bracket is attached to the seat rails and is connected to the lifting mechanism via a motion transmitting element or control cable device. The lifting mechanism is mounted onto the front edge section which is pivotally attached to the seat cushion. The catch mechanism includes a load-dependent breaking element which fails during a significant frontal impact to the vehicle thereby releasing the seat assembly to move in the lengthwise direction. The motion of the seat relative to the vehicle body actuates the lifting mechanism and elevates the front edge section of the seat cushion. As the edge section lifts, the supporting action of the seat cushion is improved and an occupant sitting thereon is prevented from sliding off or submarining the seat into the dashboard and/or steering column.

11 Claims, 1 Drawing Sheet

VEHICLE SAFETY SEAT HAVING A RAISABLE FRONT EDGE

FIELD

The invention relates generally to passive safety systems installed in a motor vehicle. More particularly, the invention relates to an apparatus for upwardly lifting the front edge section or knee bolster of a vehicle seat thereby improving the supportive action of the seat and preventing the forward motion of an occupant sitting thereon during a significant frontal impact to the motor vehicle.

BACKGROUND

During a significant frontal impact to a motor vehicle, the passenger(s) is accelerated forwards in response to the impact force. The risk of injury may be greatly reduced by a highly placed level of support (e.g., such as an upraised knee bolster) at the front edge of the seat cushion. In particular, this upraised portion also significantly improves the restraining action of the seat belt (when properly adjusted) and prevents the passenger from slipping through or "submarining" beneath the seat belt. In normal driving conditions, however, the knee bolster should remain in a lowered position for reasons of seating comfort.

From French patent document FR-PS 1 012 718, it is known how to tip a vehicle seat backwards, about a transverse axis of the motor vehicle in the event of a frontal impact. This backwards tipping movement of the seat is executed by a connecting rod having a first forward end attached to the front fender and a second rearward end extending into the passenger compartment and connected to the seat. In the event of a frontal impact, the connecting rod is moved into the passenger compartment and detaches the seat from its front support, thus tipping the seat such that it rotates generally backwards about a transverse axis passing through the rear seat support. However, for other safety considerations, a connecting rod which penetrates into the passenger compartment during the frontal collision is unfavorable as it presents a safety hazard to the occupant. Further, the actuation is unreliable because the connecting rod is prone to bending and jamming during its rearward movement. A further disadvantage is that the seat back also tilts backward, thus leaving the passenger's back unsupported during impact.

In German patent document DE-PS 36 31 881, there is disclosed a front edge section of a vehicle seat which is stiffened during a significant frontal impact to a motor vehicle such that the weight of an occupant cannot push the front edge section down. The stiffening action is achieved by a stretching gear, which is activated by either a pyrotechnical linear drive or a pyrotechnical rotational drive. An acceleration sensor, located at the front of the vehicle, senses the frontal impact and actuates the selected drive device. In view of all the specified components including the acceleration sensor, the pyrotechnical drive, the necessary actuating cables, and perhaps other redundant elements, such a design is overly elaborate, complex, and costly.

German patent document DE-OS 33 37 232 discloses another arrangement wherein the front edge section of a vehicle seat is raised by a lifting mechanism upon a frontal impact to a vehicle. The lifting mechanism is activated through utilization of the impact energy of the vehicle and by the relative movement of parts of the body across motion transmitting elements. This lifting apparatus utilizes the relative movement between an assembly arranged in the front of the vehicle which is caused to move rearward towards the passenger compartment by the impact deformation experienced in a frontal collision. The assembly is connected to the lifting mechanism via a cable and pulley system, so that as the assembly is moved rearward, the front edge section of the seat is raised.

There are several shortcomings with this device. For example, it is difficult to connect the lifting mechanism to the assembly, which is initially located in the front of the vehicle, because of the relatively long distances involved. Further, it is costly to build a device that is active during the frontal impact yet inactive when the seat is merely adjusted to accommodate the passenger's sitting posture and comfort requirements.

Another prior art safety mechanism for a vehicle seat is disclosed in French Patent FR-A 2 261 158, whereby a lifting mechanism is used to raise the front edge section of a vehicle seat in order to improve the supporting action of the seat cushion by enlarging the effective wedge angle. The lifting mechanism is activated by utilizing the impact energy of the vehicle through the relative motion of crumpling vehicle parts with respect to a stationary pivot joint. The lifting mechanism includes a pair of longitudinally disposed guiderails to which a rear portion of the seat is attached via a set of rollers such that the seat can slide in a lengthwise or longitudinal direction, along the guiderails. A support is provided with one end hinged to the stationary pivot joint attached to the vehicle floor and the other end pivotally attached to a seat support connection disposed on a lower middle portion of the seat cushion. In the normal operating position of the vehicle seat, the support is in a generally lowered position, since the stationary pivot joint is disposed in front of the support connection. The support is held in this position by a spring. During a frontal collision, an inertia force associated with the seat and the passenger sitting thereon is sufficient to overcome the spring force. As a result, the seat moves forward and the support is pivoted generally upward thereby raising the seat's front edge.

A shortcoming of this arrangement is that in operation, the seat back becomes tilted too far backward thereby losing its supporting action. Furthermore, the lengthwise guiderails are part of the lifting mechanism and cannot be used for seat adjustment purposes when an adjustment in lengthwise direction is desired solely for comfort reasons. Additional guiderails are required to accommodate this purpose thereby increasing the complexity and cost of the device.

Thus, there is a definite and as yet unfulfilled need for an inexpensive, simple, and effective device for elevating a front edge section of a vehicle seat during a significant frontal impact to a motor vehicle in a safe manner and which overcomes the problems of the prior art.

THE INVENTION

Objects

It is a principle object of the invention to provide improved protection for the occupant of a motor vehicle in the event of a significant frontal impact to the vehicle.

It is still another object of the invention to provide a simple and inexpensive apparatus for raising a front edge section of a vehicle seat during the significant frontal impact to the motor vehicle thereby preventing the occupant sitting thereon from sliding off the seat and into a dashboard or steering column.

These and other objects of the present invention will no doubt become apparent to those skilled in the art from the following detailed description of the preferred embodiment illustrated in the drawing and further in view of the appended claims.

DRAWINGS

The invention is illustrated in more detail by reference to drawing in which:

FIG. 1 illustrates a side elevational view of the improved safety device.

SUMMARY

The objects of the invention are achieved by providing a lifting mechanism for raising a front or leading edge section of a seat cushion of a seat assembly disposed in a motor vehicle. The seat assembly is supported on a set of longitudinally disposed seat rails attached to the interior floorboard of the vehicle. The seat assembly is adjustable forwardly or rearwardly in a lengthwise or longitudinal direction along the rails. The activation of the lifting mechanism occurs by means of a motion transmitting element. The motion transmitting element connects a fixed portion of the vehicle body (e.g., a floor-mounted bracket) to the lifting mechanism on the vehicle seat. In the preferred embodiment, the bracket is attached to the seat rails and is connected to the lifting mechanism via a motion transmitting element or control cable device. The lifting mechanism is mounted onto the front edge section which is pivotally attached to the seat cushion. The seat assembly is selectably locked at a position along the rail by a catch mechanism. The catch mechanism includes a load-dependent release or breaking element which fails during a frontal impact to the vehicle above a predetermined severity.

The catch mechanism and the lifting mechanism are actuated by the movement of the seat assembly relative to the vehicle body. More specifically, upon a frontal impact above the predetermined severity, the inertia forces associated with the seat assembly and the seated passenger is sufficient to overcome and break the breaking or seat restraining element and thereby release the seat assembly and allow it to move relative to the vehicle body. As the seat moves forward along the rails, it does so relative to the bracket which is attached to the stationary rail. This relative motion actuates the lifting mechanism causing it to elevate the front edge section of the seat cushion. As the edge section lifts, the supporting action of the seat cushion is improved and an occupant sitting thereon is prevented from sliding off or submarining from the seat into a dashboard or steering column.

The breaking or release element is designed to fail (i.e., release the catch mechanism) when the vehicle experiences an acceleration associated with an impact of about 5 g's. This design threshold is higher than which occurs during normal operating conditions.

The lifting mechanism is attached to the seat cushion of the seat assembly and is preferably disposed within the seat cushion itself. The lifting mechanism includes a lifting lever which at one end is connected to the front edge section of the seat cushion and at the opposite end is connected, via the cable, to the bracket attached to the rail. The movement of the seat assembly, with respect to the bracket, pivots the lifting lever and elevates the front edge section during the frontal impact. The lifting of the front edge section increases the effective seat wedge angle (i.e., the angle between the seat cushion and the front edge section of the seat when moved to its elevated or upraised position). During normal operating conditions, the front edge section is not raised and the seat wedge angle is generally zero. During the frontal impact, the section is elevated such that the seat wedge angle increases to some non-zero value. As the effective seat wedge angle increases the supporting action of the seat assembly is improved thereby preventing the seated passenger from sliding off or submarining from the seat and under the seat belt.

In the preferred embodiment, the motion transmitting element is a cable control device which links the bracket to the lifting lever of the lifting mechanism. It should be noted that alternate motion transmitting elements, such as jointed rods, may be used. However, whatever type of motion transmitting element is used, it is highly desirable and preferable to use short distances to link up the motion transmitting elements so that simple and economical designs are possible.

In order to better adapt the movement and the direction of engagement with the lifting mechanism, the motion transmitting element or control cable device passes over at least one deflection pulley which, in the preferred embodiment, is also disposed inside the seat cushion.

In the preferred embodiment, the forward motion of the seat assembly relative to the stationary vehicle body is required to raise the front edge section. However, it is not desirable to have the seat assembly continue its lengthwise forwardly movement after the front edge section is raised, since to do so would cause the seat assembly and the occupant thereon to ultimately collide with the dashboard or steering column. Thus, it is necessary to limit the lengthwise movement of the seat after its release by the catch mechanism. In other words, after the breaking element fails, it is necessary to stop or limit the seat assembly after it travels a predetermined free travel distance. A brake or stop element may be used to stop the seat assembly's lengthwise movement once the predetermined free travel distance is reached. The stop is preferably a shock absorber of a type which cushions the abrupt impact of the seat assembly.

When the seat assembly is readjusted for comfort reasons along the lengthwise direction, the stop must be correspondingly readjusted to maintain the length of the predetermined free travel distance. A mechanism for readjusting the lengthwise position of the seat assembly is mechanically connected to a similar mechanism that readjusts the lengthwise position of the stop such that the repositioning of the seat assembly also repositions the stop.

In the preferred embodiment, a single handle is used to adjust the position of the seat assembly and also to position the stop in the lengthwise direction. It should also be noted that the breaking element of the catch mechanism, is of less sturdy design than the stop.

As described earlier, one end of the cable control device is connected to one end of the lifting lever of the lifting mechanism while the opposite end is attached to the front edge section of the seat cushion. The other end of the cable control device is connected to the bracket disposed beneath the seat cushion and attached to the seat rail. Thus, as the seat assembly moves relative to the stationary portion of the vehicle (i.e. the bracket) the cable control device is tensioned in such a manner so as to pivotally rotate the lifting lever and thereby elevate the front edge section of the seat cushion.

Similar to the stop discussed above, it is necessary to readjust the bracket's position along the rail when the seat assembly itself is readjusted along the rail. Furthermore, the adjustment mechanism and the bracket element must be designed to withstand greater forces than the breaking element of the catch mechanism.

In conventional vehicle seats, the front edge seat section or region is usually designed as a raised bolster to support the back of the knees. In the preferred embodiment, the front edge section is designed to enable an upward lifting or swivel. To accomplish the swivel motion, the cable control device should be connected across one or more deflection pulleys to the lifting lever which in turn is attached to the front edge section of the seat cushion.

DETAILED DESCRIPTION OF THE BEST MODE

Figure 1:
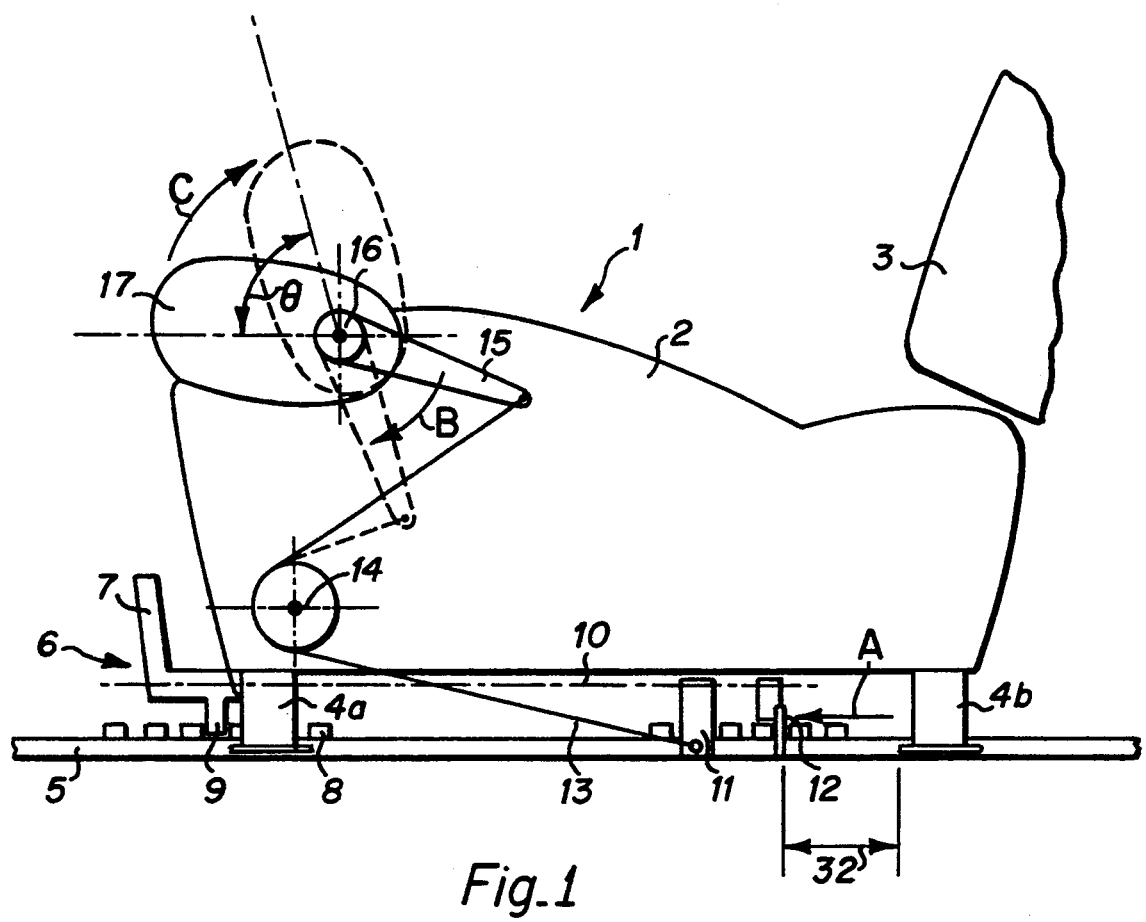

The following detailed description illustrates the invention by way of example, not by way of limitation of the principles of the invention. This description will clearly enable one skilled in the art to make and use the invention, and describes several embodiments, adaptations, variations, alternates, and uses of the invention, including what I presently believe is the best mode of carrying out the invention.

FIG. 1 depicts, in side elevation, a vehicle seat assembly 1 including a seat cushion 2, a backrest 3, and a pivoting front or leading edge section 17. The seat assembly 1 can move in the lengthwise or longitudinal direction and is restrained by seat holders 4a and 4b in seat rail 5. It is understood that while only one seat rail 5 is shown in FIG. 1, a parallel running seat rail and corresponding seat holders are located on the transversely opposite side of the vehicle seat.

A catch mechanism 6 locks the seat assembly 1 in place along the seat rail 5 and includes a handle 7, a breaking element 9, a bracket 11, and a stop 12. The handle 7, as illustrated, protrudes outwardly from beneath the front of the seat assembly 1 so as to permit easy manipulation by an occupant. The handle 7 is mechanically linked to the breaking element 9 which is engaged with toothed rack 8 disposed on the seat rail 5. By manipulating the handle 7 and selectively disengaging the breaking element 9 from the toothed racks, the seat assembly 1 can be slidably repositioned in the lengthwise direction along the seat rail 5 as desired to accommodate the passenger's specific leg room requirements.

As will be discussed in greater detail below, the leading edge section 17 is lifted by the movement of the seat assembly 1 relative to the vehicle body. Immediately after the frontal impact, the vehicle's forward movement comes to a rest. However, the inertia of the seat assembly 1 causes it to continue in its forward movement and act against the breaking element 9. If the inertia force is sufficiently large (e.g., where an acceleration greater than about 5 g's occurs), then the inertia of the seat assembly 1 will cause the breaking element 9 to fail and release the seat assembly 1 thereby allowing it to move forward in the direction as indicated by arrow A.

The relative motion between the seat assembly 1 and the vehicle body is transmitted to the section 17 by a control cable device 13. One end of the cable device 13 is attached to the moving seat assembly 1, while the opposite end is attached to the bracket 11 which is attached to the non-moving seat rail 5.

The forward motion of the seat assembly 1 relative to the stationary vehicle body is required to activate front edge section 17. However, it is not desirable to have the seat assembly 1 continue its lengthwise forwardly movement after the front edge section 17 is raised because to do so would cause the seat assembly 1 and the occupant thereon to ultimately collide with the dashboard or steering column.

Accordingly, a brake or stop element 12 is provided for stopping the seat assembly's lengthwise forwardly movement once the predetermined free travel distance 32 is reached. The stop 12 is designed as a shock absorber to cushion the abrupt impact of the seat assembly 1.

When the seat assembly 1 is readjusted in the lengthwise direction, the stop 12 and the bracket 11 must be correspondingly readjusted in the lengthwise direction to maintain the length of the predetermined free travel distance 32. The bracket 11 and the stop 12 are attached to the seat rail 5, and are linked to the handle 7 via a linkage mechanism (not shown, although a line of action 10 is illustrated). The handle 7 is used to simultaneously disengage the element 9 from the toothed rack 8 and disengage the stop 12 and the bracket 11 from the rail 5. The seat assembly 1 can be repositioned to another location while maintaining the distances between element 9, and the bracket 11 and the stop 12. It should also be noted that the breaking element 9 is of less sturdy design than the stop 12.

In FIG. 1, the position of the vehicle seat assembly 1 is shown for normal operating conditions, i.e., the front edge section 17 is in its normal, lowered position. During a frontal impact in excess of the 5 g design threshold, the breaking element 9 will fail, thereby releasing the seat assembly 1 to travel forwardly in the lengthwise direction along the seat rail 5. One end of the control cable device 13 is held fixed to the vehicle body by the bracket 11 while the other end of the cable 13 moves along with the forwardly travelling seat assembly 1. The relative movement between the seat assembly 1 and the bracketed end of the cable results in the deflection pulley 14 tensioning or deflecting the control cable 13 generally downward thereby pivoting the lifting lever 15 to its emergency position (shown in phantom) in the direction as indicated by arrow B. The movement of the lifting lever 15 in a generally downward clockwise direction causes the leading edge section 17 to pivot about the axis 16 in a generally upward or clockwise direction as shown by arrow C. In this manner, an effective seat wedge angle $\theta$ is increased from a value of nearly zero at normal operating conditions to some substantially higher value upon an impact. The supporting action of the seat assembly 1 is enhanced because an occupant of the seat assembly is blocked from sliding off the seat into the dashboard or steering column.

Furthermore, the seat assembly 1 continues to travel along the rail 5 until the predetermined free travel distance 32 is reached. After the seat assembly 1 has travelled the distance 32 it is halted by the stop 12. Injury to the occupant is prevented by stopping the seat assembly's forward motion before it and the occupant thereon can impact the dashboard or steering column but after it has travelled the short distance necessary to elevate the front edge section 17.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. An improved safety system in a vehicle including a least one seat for the occupant, wherein said seat is slide adjustable along a pair of seat rials, said safety system comprising in operative combination:
   a) at least one vehicle seat having a front edge portion adapted for pivot movement between a first lowered position and a second pivoted upward position, said front edge portion when pivoted upward creating an enlarged effective wedge angle to prevent the occupant from submarining from the vehicle seat;
   b) mean for lifting said front edge portion of said seat to said second pivoted upward position;
   c) a load-dependent release element for restraining the slide adjustment of the slide adjustable seat at a plurality of present positions, said release element adapted to release said seat and permit forward travel thereof in the event of an acceleration in excess of a predetermined severity level; and
   d) means for transmitting forward inertial motion of said seat to the pivot motion of said front edge portion lifting means.

2. An improved safety system in a vehicle as in claim 1 which includes means for limiting the range of forward travel of said adjustable seat to a preset path distance when said predetermined severity level is exceeded and said release element has released said seat.

3. An improved safety system in a vehicle as in claim 2 wherein:
   a) said means for limiting seat travel in a stop member; and
   b) said stop member is position-adjustable along with said seat so that said preset path distance is maintained constant over all fore/aft positions of said seat.

4. An improved safety system in a vehicle as in claim 2 wherein said motion transmitting means includes a cable control connecting a bracket member adjustably engaging said seat rail, to said front edge portion raising means.

5. An improved safety system in a vehicle as in claim 3 wherein said motion transmitting means includes a cable c control connecting a bracket member adjustably engaging said seat rail, to said front edge portion raising means.

6. An improved safety system as in claim 4 wherein said cable control is guided across at least one deflection pulley.

7. An improved safety system as in claim 3 wherein said cable control is guided across at least one deflection pulley.

8. An improved safety system as in claim 4 wherein:
   a) said front edge portion of said seat is configured as part of the seat cushion; and
   b) said lifting means includes a lever.

9. An improved safety system as in claim 5 wherein:
   a) said front edge portion of said seat is configured as part of the seat cushion; and
   b) said lifting means includes a lever.

10. An improved safety system as in claim 6 wherein: said front edge portion of said seat is configured as part of the seat cushion; and
    b) said lifting means includes a lever.

11. An improved safety system as in claim 7 wherein:
    a) said front edge portion of said seat is configured as part of the seat cushion; and
    b) said lifting means includes a lever.

* * * * *